United States Patent
Poppen

[19]

[11] Patent Number: 5,893,081
[45] Date of Patent: Apr. 6, 1999

US005893081A

[54] USING MULTIPLE LEVELS OF COSTS FOR A PATHFINDING COMPUTATION

[75] Inventor: Richard Frederick Poppen, San Jose, Calif.

[73] Assignee: Etak, Inc., Menlo Park, Calif.

[21] Appl. No.: 756,263

[22] Filed: Nov. 25, 1996

[51] Int. Cl.$^6$ ............................................ G06F 17/00
[52] U.S. Cl. .................. 705/400; 364/400; 370/351; 701/25; 701/201; 701/202
[58] Field of Search ................. 364/400; 370/254, 370/255, 256, 351; 395/200.71; 701/25, 26, 201, 202; 705/400

[56] References Cited

U.S. PATENT DOCUMENTS

| | | | |
|---|---|---|---|
| 5,031,093 | 7/1991 | Hasegawa | 395/200.71 |
| 5,170,353 | 12/1992 | Verstraete | 701/202 |
| 5,276,768 | 1/1994 | Bander | 395/10 |
| 5,285,391 | 2/1994 | Smith, Jr. et al. | 701/200 |
| 5,452,294 | 9/1995 | Naterajan | 370/351 |
| 5,495,479 | 2/1996 | Galaand et al. | 370/404 |
| 5,521,910 | 5/1996 | Matthews | 370/256 |
| 5,523,950 | 6/1996 | Petersin | 701/117 |
| 5,600,638 | 2/1997 | Bertun et al. | 370/351 |

OTHER PUBLICATIONS

*Graphs, Networks, and Algorithms*, Swamy, M.N.S. and K. Thulasiraman, K., Publisher: John Wiley & Sons, 1981, pp. 1–592.

*Primary Examiner*—Edward R. Cosimano
*Attorney, Agent, or Firm*—Fliesler, Dubb, Meyer & Lovejoy LLP

[57] ABSTRACT

A system for computing a path in a processor readable representation of a network which can minimize an identified cost. The cost can include time, distance, tolls paid, ease of turning, quality of scenery, processing time, waiting time, etc. A user of the pathfinding system can choose one or more categories of elements to avoid. For example, the user may want to avoid toll roads in a map of roads. The costs associated with the elements to avoid includes at least two levels of representation. The two levels of representation include a first level and a second level such that the second level is superior to the first level. The pathfinding system will determine a path which minimizes costs.

50 Claims, 4 Drawing Sheets

USING MULTIPLE LEVELS OF COSTS FOR A PATHFINDING COMPUTATION

CROSS-REFERENCE TO RELATED APPLICATIONS/PATENTS

This Application is related to the following Application: U.S. patent application, entitled METHOD FOR DETERMINING EXITS AND ENTRANCES FOR A REGION IN A NETWORK, by inventor Richard F. Poppen, Ser. No. 08/756,258, filed Nov. 25, 1996.

This related Application is incorporated herein by reference.

BACKGROUND OF THE INVENTION

1. Field of the Invention

The present invention is directed to a system that uses multiple levels of costs for a pathfinding computation.

2. Description of the Related Art

Computers have revolutionized the idea of modeling systems for enhanced study and use of the systems. One example is the modeling of a system as a network. A network is defined in its most general sense as something that includes a number of paths that interconnect or branch out. Many systems that involve decisions can be modeled as a network. For example, a manufacturing process or a system of providing medical treatment can be modeled as a network of decision points and actions between decision points. This network can be represented in electronic form and stored on a processor readable storage medium so that software can be created for using the network model to study or use the system.

One example of a useful network that can be stored in electronic form is the electronic map, which includes geographically referenced electronic data quantifying a physical, social or economic system. The range of information included in electronic maps is unlimited; for example, electronic maps could include distances between elements, travel time, lot numbers, tax information, tourist information, processing time, waiting time, etc. Additionally, storing a map as a file on a computer allows for unlimited software applications to manipulate that data.

One advantage of the electronic map is that it can store and determine costs associated with various portions of a map. A cost is a variable that can be minimized or maximized. Note that the costs are not necessarily monetary costs. Rather a cost is something to be minimized or maximized. Typically costs are represented as integers. Sometimes costs can be represented as real numbers. Examples of costs include time, distance, tolls paid, ease of turning, quality of scenery, etc.

Electronic maps, as well as other networks, can also be used for pathfinding, which is a method for computing a route between an origin and a destination. Some systems compute recommended routes and guide the driver by highlighting the recommended route on a map display, or by giving turn-by-turn directions, or both.

When a pathfinding system is computing a recommended route to a destination, it does so by finding the most desirable route according to certain specified criteria. These criteria may be specified by the driver, or may be set as defaults at the time of manufacture. Often, a system will be used to find a path that minimizes (or maximizes) some cost, for example, driving time. One feature that is useful to users of pathfinding systems is the ability to avoid certain elements in the electronic map. A user may want to avoid certain types of roads, turns, intersections, etc. For example, in certain geographic regions, there exist free roads and toll roads. A user may want to find a path that avoids toll roads even if it means longer driving time. Alternatively, a user may also want to avoid use of ferries, tunnels or bridges, etc. In the past, this has been accomplished by making the cost per unit distance of the undesirable road (or other element in the map) very high. That way, the undesirable road (or element) will be used to build a path only when it is sufficiently expensive to avoid it.

The technique of making undesirable elements of an electronic map very expensive has not proven to be an effective means for avoiding the use of the undesirable element. First, making a road segment expensive does not guarantee that the undesirable road will be avoided if possible. That particular type of road may still be chosen in order to avoid a more expensive route on different roads. Second, the prior art technique for avoiding undesirable roads will not guarantee that if a path requires travel on an undesirable road, that the travel on the undesirable road be minimized. Finally, previous attempts to use very large integers to represent an expensive cost can cause an overflow in many computers. Similarly, using a large real number can lead to loss of significance.

Therefore, a system is needed that can compute a path using an electronic map or other network that can attempt to avoid certain categories of elements of the electronic map or other network.

SUMMARY OF THE INVENTION

The present invention, roughly described, provides for a system for computing a path in a network that uses multiple levels of costs. A determination is made as to what elements should be avoided. The costs associated with at least one of the elements includes two or more levels of representation. The two or more levels of representation include a first level and a second level. The system then performs a pathfinding exploration.

In one embodiment, the system includes the steps of distinguishing a first set of elements in a processor readable representation of a network and creating a first cost associated with a first element of the first set of elements. The first cost includes at least two levels of representation. The system then performs a pathfinding exploration using the created first cost. The step of distinguishing can include receiving input from the user of the pathfinding system or can be done automatically by the pathfinding system. The two levels of representation may include a first level and a second level, where the second level is superior to the first level. Alternatives including identifying an additional set of elements to avoid and creating costs for these additional elements that include three levels of representation. The three levels of representation include the first level, the second level and a new third level. The third level of representation is superior to the first and second levels.

In one embodiment, the present invention performs a pathfinding exploration from an origin to a destination including the step of finding a first path from a first node to a second node where the first path includes a first set of one or more links and a first set of one or more costs. The pathfinding exploration also includes finding a second path from the first node to the second node, where the second path includes a second set of one or more links and a second set of one or more costs. At least one of the second set of costs includes two levels of representation. The pathfinding exploration chooses the first path instead of the second path because the first set of one or more costs are more efficient than the second set of one or more costs.

The processor readable representation of the network can be created by identifying nodes, identifying links between nodes and identifying costs for traversing the links. Data representing the nodes, links and costs are stored in a database on a processor readable storage medium. At least one of the stored costs includes two levels of representation.

These and other objects and advantages of the invention will appear more clearly from the following detailed description in which the preferred embodiment of the invention has been set forth in conjunction with the drawings.

BRIEF DESCRIPTION OF THE DRAWINGS

FIG. 2 is an example of a directed graph representing a part of an electronic map.

DETAILED DESCRIPTION

Figure 1:
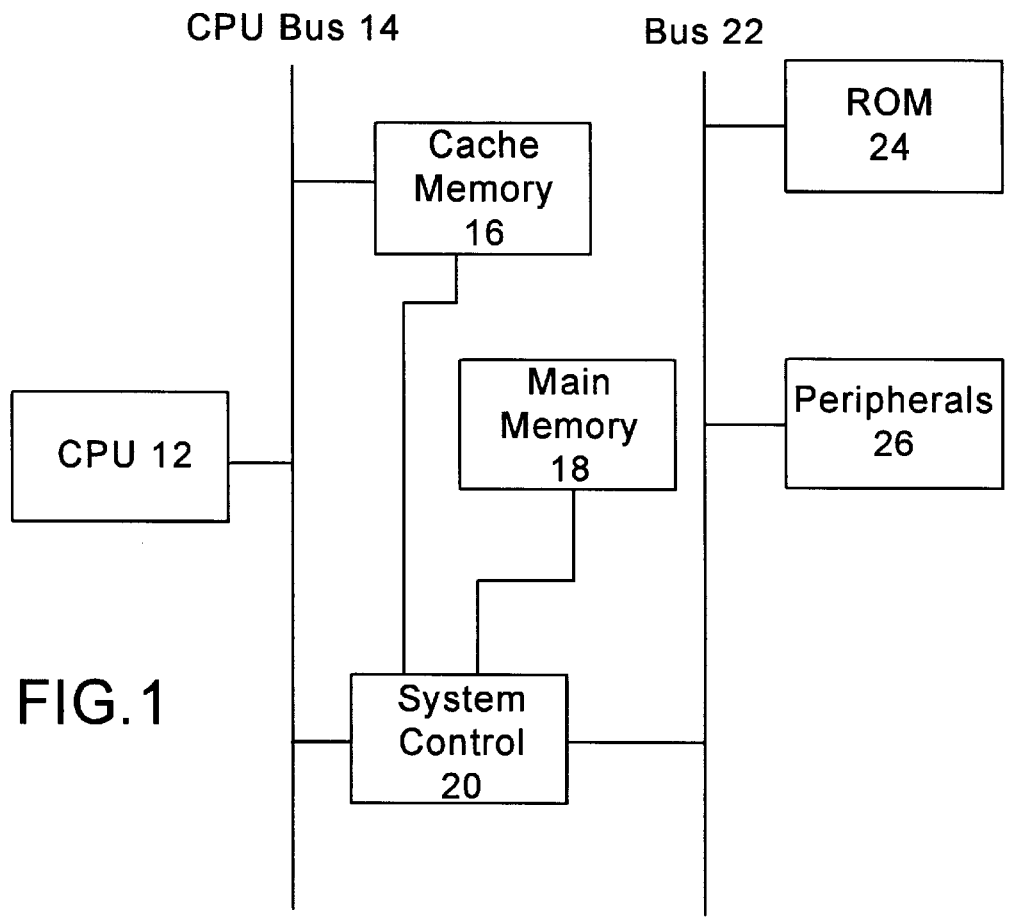
FIG. 1 is a block diagram of one exemplar hardware architecture that can be used to practice the present invention.

FIG. 1 is a symbolic block diagram of one exemplar hardware architecture that can be used to practice the present invention. The hardware includes CPU 12, which may be an Intel 80486 compatible CPU, Pentium Processor, or other suitable processor. CPU 12 has address, data and control lines which are connected to CPU bus 14. CPU bus 14 is also connected to a cache memory 16 and to main memory 18, both of which are controlled by system control logic 20. System control logic 20 is connected to CPU bus 14 and also to control, address and data lines of bus 22. Connected to bus 22 is ROM 24, which contains the system BIOS, and Peripherals 26, which can include a floppy, a hard-disk drive, CD-ROM drive or other peripheral device. Cache memory 16, DRAM memory 18, ROM 24, a CD-ROM and a floppy disk are all processor readable storage devices (or media). Various embodiments of the current invention use various amounts of software to perform the described methods. This software can reside on any suitable processor readable memory. Not depicted in FIG. 1, but included in the hardware, is a display and an input device such as a keyboard or pointing device. The system of FIG. 1 illustrates one platform which can be used for the present invention. Numerous other platforms can also suffice, such as Macintosh-based platforms available from Apple Computer, Inc., platforms with different bus configurations, networked platforms, multi-processor platforms, other personal computers, workstations, mainframes, navigation systems, and so on.

An electronic map is stored in one or more computer files which include the data necessary to construct a map. This data could include longitude and latitude data, addresses, distances, turning restrictions, driving times, highway exit numbers, descriptions of commercial uses of properties, etc. Although the above listed information can be found in an electronic map, it is possible to create an electronic map with only a subset of the above listed information or with other information. The computer files representing an electronic map are stored on a processor readable storage medium.

Generally, an electronic map to be used for pathfinding includes a graph. A graph is a collection of nodes and edges. Nodes are objects that have properties and indicate decision points on the graph. An edge is a connection between two nodes. A path from node A to node B in a graph is described as a list of nodes such that there is an edge from each node in the list to the next. A directed graph is a graph in which each edge has a single direction associated with it. There may be two edges between a given pair of nodes, one in each direction. In a dire graph, edges are referred to as links. A weighted graph is a graph in which each link (or edge) has a cost associated with it. Alternatives includes associating the costs with the nodes, with the nodes and links, or associating costs with another element of the graph. An undirected graph is a graph where each link is bidirectional. An undirected graph can be thought of as a directed graph where each link represents two links with the same end points but different directions.

Figures 2A, 2B:
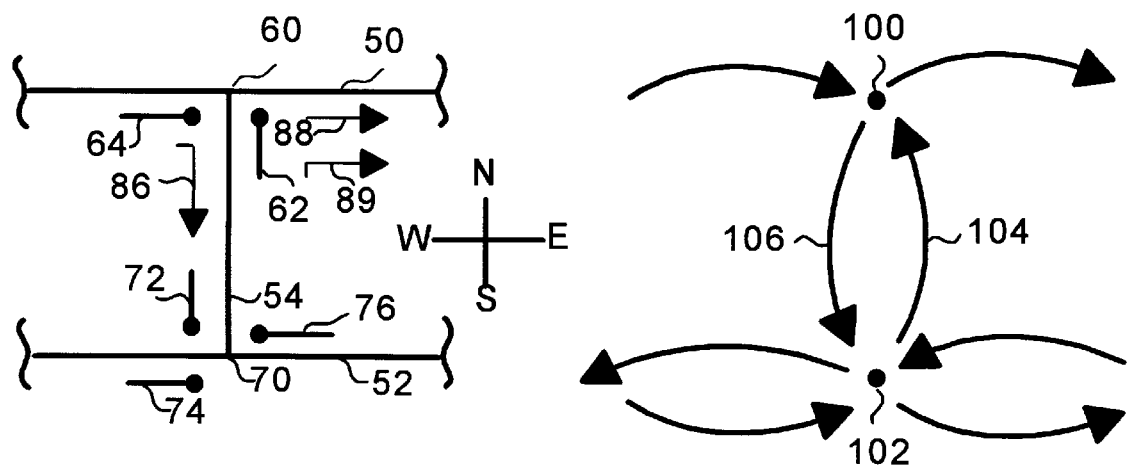
FIG. 2B is a second example of a directed graph representing a part of an electronic map.

FIG. 2A shows an exemplar directed graph which shows eastbound one-way street 50 and two-way street 52, both intersecting with two-way street 54. Street 50 intersects with street 54 at intersection 60. Street 52 intersects with street 54 at intersection 70. At intersection 60 are two nodes, 62 and 64. The head of the node is a circle. The rear of the node is a straight-line tail. The circle represents where the node is located and the tail represents where a traveler would come from to reach that node. The node symbol is displaced from the actual intersection for purposes of visibility. For example, node 62 represents travel northbound on stet 54 toward intersection 60. Node 64 represents travel eastbound on road 50 toward intersection 60. There is no node at intersection 60 to represent westbound travel on street 50 because street 50 is an eastbound one-way street. Thus, a traveler proceeding north on road 54 and reaching intersection 60 can only make a right turn. Node 72 represents arriving at intersection 70 by traveling south on street 54. Node 74 represents arriving at intersection 70 by traveling east on road 52. Node 76 represents arriving at intersection 70 by traveling west on road 52.

Links represent a path between nodes. For example, from node 64 a traveler can make a right turn at intersection 60 to enter road 54 or can proceed straight on road 50. Link 86 represents travel starting from intersection 60 on road 50 facing east, making a right turn at intersection 60 and proceeding south on road 54. Thus, link 86 connects node 64 to node 72. Link 88 connects node 64 to the next node on street 50 (not shown on FIG. 2A) and represents travel east along road 50, proceeding straight through intersection 60 without turning. Link 89 represents travel starting from intersection 60 on road 54 facing north, making a right turn at intersection 60 and proceeding east on road 50; therefore, link 89 connects node 62 to the next node on street 50 (not shown on FIG. 2A). FIG. 2A only shows links drawn for nodes 62 and 64. If links are drawn for all nodes, the direct graph would become too crowded and would be difficult to read. Thus, the directed graph is simplified and redrawn as in FIG. 2B.

In FIG. 2B, all the nodes at the same intersection are collapsed into one node to make the following explanation simpler. (In actual use, the present invention can make use of a graph similar to FIG. 2A or FIG. 2B.) Thus, node 100 represents nodes 64 and 62. Node 102 represents nodes 72, 74 and 76. Note that the tails of the nodes are not drawn. The links are used to indicate directions of allowable travel. Link 104 indicates travel from intersection 70 to intersection 60 and link 106 indicates travel from intersection 60 to intersection 70. Turn restrictions and one-way streets are represented by the presence or absence of a link.

The directed graph of FIG. 2B is used to symbolically understand the data structure stored in a processor readable storage medium. A processor readable storage medium does not actually store an image of a directed graph. Rather, a data structure is stored. Each entry in the data structure represents a node. For each node, the data structure stores the location of the node (e.g., latitude and longitude), a list of neighboring nodes (nodes which can be traveled to via one link) and the various costs associated with getting to the neighboring nodes. It is contemplated that the present invention will work with many suitable data structures different from the one described. Furthermore, the invention need not be used with a directed graph. The present invention can be used with the entire map database, or any other suitable subset of information. Furthermore, one or more entries in a data structure can be grouped together in a cluster of data A cluster of data is a grouping of related data. Although clusters improve performance, the present invention can be used without clusters.

Figure 3:
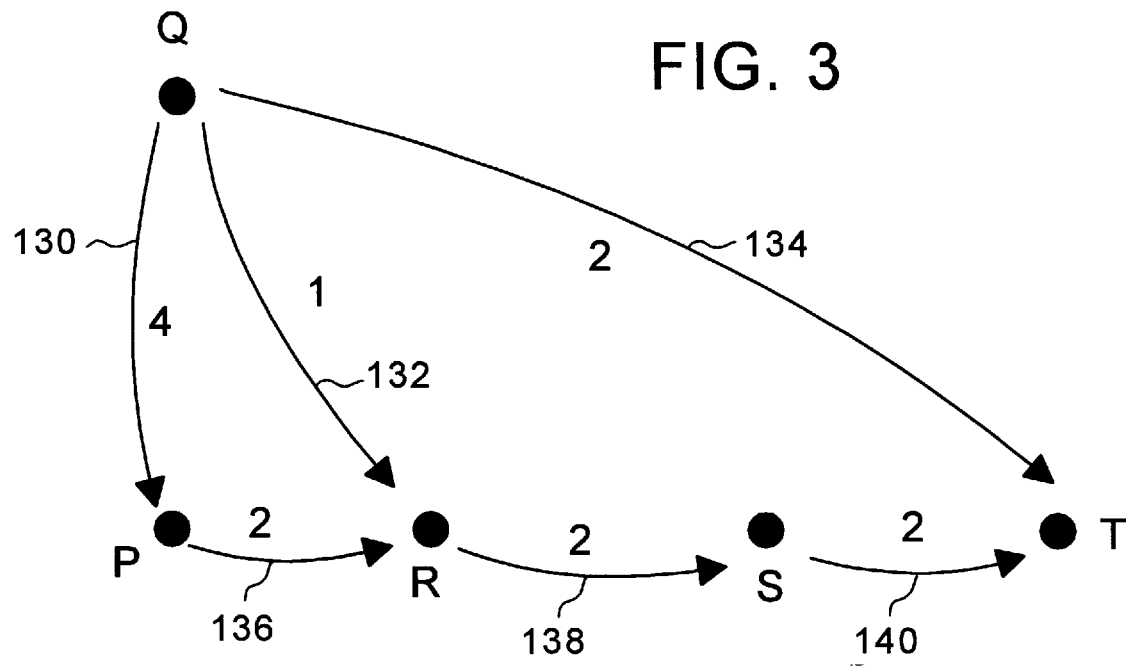
FIG. 3 is a third example of directed graph representing part of a network.

FIG. 3 represents a directed graph for a portion of a network. The directed graph depicted includes five nodes (Q, P, R, S and T) and six links (130, 132, 134, 136, 138 and 140). Each of the links includes a number adjacent to the link. Each adjacent number represents a cost of traveling along that link. Link 130 connects node Q to node P and has a cost of 4. Link 132 connects node Q to node R has a cost of 1. Link 134 connects node Q to node T and has a cost of 2. Link 136 connects node P to node R and has a cost of 2. Link 138 connects node R to node S and has a cost of 2. Link 140 connects node S to node T and has a cost of 2.

There are three paths for traveling from node Q to node T. The first path includes traveling along link 134 directly from node Q to node T. This path will be identified as QT, and has a cost of 2. Second path includes traveling from node Q, to node R, to node S and to node T. The second path will be identified as QRST. The path QRST traverses along links 132, 138, and 140 and has a total cost of 5. The total cost is computed by adding the costs of each of the links traveled along the route. The third path includes the path QPRST and has a total cost of 10.

Costs can be assigned independently for each link. For efficiency purposes, however, a systematic method is used for assigning costs. For example, the electronic map typically uses a relatively small set of road types (or categories) and a relatively small set of turn types. The system assigns a cost per unit length for each road type, and for each turn type. Then the costs of a link is computed by finding its length (e.g. distance) and multiplying by the cost per unit length for applicable type of road and adding the costs of any turns along the link. Costs may also include extra charges (for example, tolls) or discounts (for example, scenic value). Depending on the implementation, costs may be computed and assigned once when the data file is built. Alternatively, the costs may be determined at run time.

Typical pathfinding systems represent cost as either integers or real numbers. However, this invention uses multiple levels of costs. The use of multiple levels of cost is mathematically justified by a concept called "nonstandard arithmetic."

Ordinary (or standard) arithmetic, as used in pathfinding computations, uses the set Z of integers (or the set R of real numbers) (To avoid constant remarks of this type, only integers will be discussed. However, parallel statements about real numbers are also true.). "Non-standard arithmetic" is arithmetic on a larger set of numbers called $*Z$, the "non-standard integers." The set of non-standard integers has the following properties: (1) $*Z$ contains the standard integers ($Z \subset *Z$); (2) $*Z$ contains "infinite integers," that is, there are elements z in $*Z$ such that $z>n$ for any element n of Z; (3) $*Z$ is a structure that mathematicians call a ring, that is, all the usual properties of addition, subtraction an multiplication still apply in $*Z$; and (4) the integers Z are a "subring" of $*Z$, that is, the result of adding, subtracting or multiplying integers is the same in $*Z$ as it is for Z.

For ease of notation, we denote $\omega$ to represent some infinite integer such that $\omega$ is an element of $*Z$ and $\omega$ is greater than any element n of Z.

The invention represents nonstandard costs in the form $a_n\omega^n + a_{n-1}\omega^{n-1} + \ldots + a_1\omega + a_0$. Addition of two nonstandard integers is computed as follows:

TABLE 1

$C = A + B$
$A = a_2\omega^2 + a_1\omega + a_0$
$B = b_2\omega^2 + b_1\omega + b_0$
$C = (a_2 + b_2)\omega^2 + (a_1 + b_1)\omega + (a_0 + b_0)$
$F = D + E$
$D = d_1\omega + d_0$
$E = e_0$
$F = d_1\omega + (d_0 + e_0)$ Similarly, the result of multiplication of the non-standard integer $a_1\omega + a_0$ by an integer x is equal to $xa_1\omega + xa_0$. Under non-standard arithmetic, one compares two costs $A = a_n\omega^n + a_{n-1}\omega^{n-1} + \ldots + a_1\omega + a_0$ and $B = b_n\omega^n + b_{n-1}\omega^{n-1} + \ldots + b_1\omega + b_0$ finding the largest j, such that $a_j \neq b_j$. If there is such a j and if $a_j > b_j$, then $A > B$. If $a_j < b_j$, then $A < B$. If there is no j such that $a_j \neq b_j$, then $A = B$.

In one implementation, the costs will use powers of $\omega$ up to some fixed maximum. For example, it may be that all cost use only $\omega$ and $\omega^2$. Other cost models may use higher powers of $\omega$. By using a fixed maximum number of powers of $\omega$, a non-standard value can be represented by a computer as an array of integers. If the maximum power of $\omega$ used is $\omega^n$, then costs can be represented by arrays of (n+1) integers. For purposes of using a computer, it is convenient to let the array [a[n],a[n-1], . . . ,a[1],a[0]] represent the value a[n]$\omega^n$+a[n-1]$\omega^{n-1}$+ . . . +a[1]$\omega$+a[0]. Of course, there are other schemes for representing non-standard numbers.

Given such representation of non-standard costs, two costs can be added by adding the corresponding elements and their respective arrays. That is, if the two costs represented by two arrays [a[n],a[n-1], . . . a[1],a[0]] and [b[n],b[n-1]1, . . . ,b[1],b[0]] then the sum is represented by the array [a[n]+b[n],a[n-1]+b[n-1], . . . ,a[1]+b[1],a[0]+b[0]]. Similarly, to compare the representation of two non-standard costs, successive array values are compared starting with the $n^{th}$ element and proceeding towards the $0^{th}$ element, until a difference is found. If no two corresponding values differ, the two costs are equal. For example, in the two arrays discussed above a[n] is first compared with b[n]. If these two values are unequal, the array with the greater value is the greater cost. If these two values are equal, then compare a[n-1] with b[n-1], and so on. If it is the case that array B has no corresponding value to a[n], that is, there is no b[n] or b[n]=0, then the A array is the greater cost. When multiplying a non-standard number represented by the array by a standard integer x, the result is represented by the array [xa[n],xa[n-1], . . . ,xa[1],xa[0]].

Using the above principle, the costs for the pathfinding process have multiple levels of representation, each level of representation being a different element of the array. In the array [a[n],a[n−1], . . . ,a[1],a[0]], the first level of representation is a[0], the second level of representation is a[1], the third level of representation is a[2], . . . , the $(n+1)^{th}$ level of representation is a[n]. Each of the values in the array corresponds to a magnitude of a level of representation of the cost. That is, the array element a[n] is a magnitude of the $(n+1)^{th}$ level of representation. A higher level of representation is considered superior to a lower level of representation. For example, a cost having its highest non-zero magnitude at a second level of representation is always greater than a cost having its highest non-zero magnitude at a first level of representation. In mathematical terms, $a\omega^n > b\omega^{n-1}$ for every non-zero a and non-zero b, where a and b are members of the set Z.

Looking back at FIG. 3, assume that the network of FIG. 3 is an electronic map and that each of the links represents a road in an electronic map. The road is divided up into various categories of roads. Example categories include alleys, residential roads, arterials, freeways, toll roads and ferries. If a user wants to avoid toll roads unless they are absolutely necessary, the user may create a cost model where all the road types include costs having a non-zero magnitude for the first level of representation and zero magnitudes at all other levels, the exception being toll roads which will have non-zero magnitudes at the second level of representation. For example, if the cost is driving time and the particular segment of a toll road (a link) has a driving time of 5 driving time units, and the cost will be represented as 5ω+0 or by an array [5,0]. If the user wanted to avoid ferries even more than avoiding toll roads, the cost model may include representing the costs of a ferry as (assuming ferry crossing time as 10) $10\omega^2 + 0\omega + 0$ or [10,0,0].

Looking at FIG. 3, assume that links 132 and 134 represent toll roads and that a user wants to avoid toll roads. A cost model is set up with two levels of representations. The costs of link 132 would be [1,0] and the costs of link 134 is [2,0]. The cost of path QT would be [2,0], the cost of QRST is [1,4] and the cost of path QPRST is [0,10]. In this example, the path with the smallest cost is QPRST. Since QPRST has the smallest total cost, it is defined to be the most efficient path.

A second example assumes that the user wants to avoid toll roads, and avoid ferries even more than avoiding toll roads. Assume that link 134 represents a toll road and link 132 represents a ferry. A cost model is set up with three levels of representation. The costs of link 134 is represented as [0,2,0]. The costs of link 132 is represented as [1,0,0]. The cost of traveling along the path QT is equal to [0,2,0], the cost of traveling along QRST is [1,0,4]. That is, the path QRST includes traversing links 132, 138 and 140. The sum of the costs of those links, respectively, are [1,0,0]+[0,0,2]+[0,0,2]=[1,0,4]. The cost of traveling along path QPRST is [0,0,10]. Again, the shortest path is QPRST.

In a third example, assume that the user wants to avoid using toll roads and that links 130, 132 and 134 are all toll roads. A cost model is set up with two levels of representation. The cost of traveling along path QT is [2,0]. The cost of traveling along path QRST is [1,4]. The cost of traveling along path QPRST is equal to [4,6]. In that situation, all paths involve traveling on a toll road; therefore, the goal would be to minimize use of the toll road. This is accomplished by comparing all three costs. As discussed above, to compare the three costs first look at the highest power of ω or the element of the array with the largest index. In this case, the path QRST includes the smallest cost because the magnitude of its second level of representation is one. The magnitude of the second level of representation of the cost for the path QT is two and the magnitude of the second level of representation of the cost for the path QPRST is four.

Multiple levels of costs can be used to perform a secondary minimization. For example, sometimes graphs can be simplified such that one link actually represents an aggregate of many other links. When creating that aggregate link, the sum of the costs can be stored as a second level of representation. The first level of representation is used to maintain a sum of the number of links in the aggregate. Thus, if two links of a cost 2 are added together, the result would be an aggregate sum of 4ω+2 or [4,2]. The 4ω represents the sum of the two costs. The +2 represents the count of the number of links added together. The result of using this type of cost model allows the pathfinding system to minimize costs among paths that have the same costs by minimizing the total number of links in the computed path. Another alternative is to put the number of links as the higher level of representation than the actual cost, which allows the number of links be minimized ahead of costs.

Another alternative includes using the norm of the cost. For a cost value $A = a_n\omega^n + a_{n-1}\omega^{n-1} + \ldots + a_1\omega + a_0$, the norm is defined to be $a_n + a_{n-1} + \ldots a_1 + a_0$. The costs can be arranged so that the norm of the cost of a link provides an estimate of driving time (or another type of cost) for the link. However, one magnitude, on its own, may not necessarily be equal to the driving time. This will allow other factors to be used in minimizing costs. For example, assume a given geographic area has two highway links, both having a driving time of 10. One highway has ugly scenery and a lot of pot holes while the other highway has a smooth road and borders beautiful scenery. The pathfinding system may want to encourage use of the nicer highway. Rather than represent both costs as [10,0], the nice highway may be represented as 2ω+8 or [2,8] while the ugly highway is represented 7ω+3 or [7,3].

Figure 4:
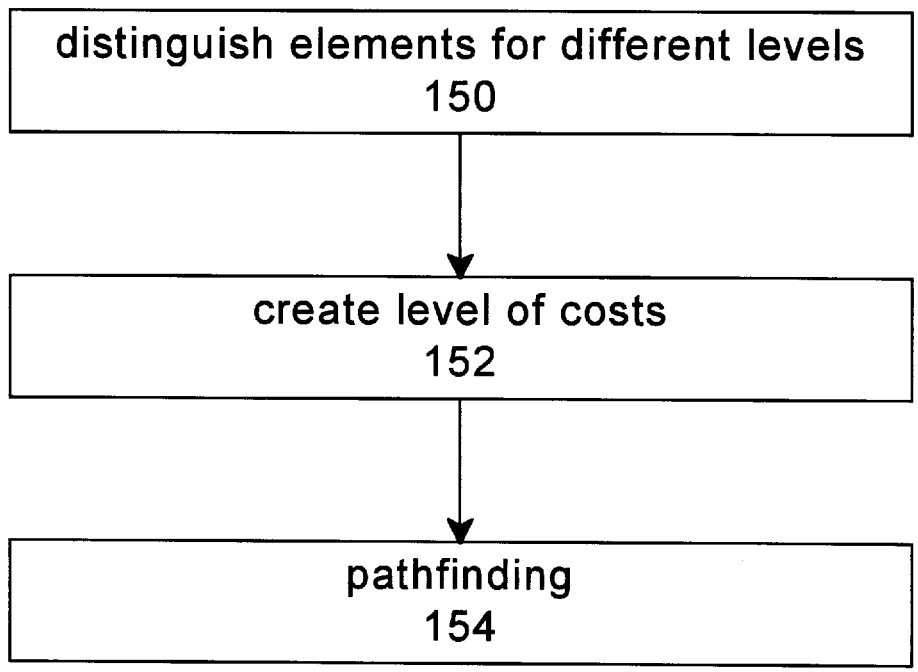
FIG. 4 is a flow chart describing the process of finding a path using multiple levels of costs.

FIG. 4 shows a flow chart describing the process of finding a path using multiple levels of costs. Step 150 includes distinguishing elements for different levels of costs. This includes identifying one or more sets of elements (e.g. links or nodes) that are to be avoided. In one embodiment, the user of a pathfinding system would use a standard map database which only includes one level of costs. At run time, prior to finding a path, the user would be queried as to which elements should be avoided. The query could be open ended, allowing the user to select any element to be avoided or the user may be asked whether a specific category of elements should be avoided. The categories may be predefined categories inherent in the network database (e.g. toll roads, arterials, residentials, etc.) or user defined categories. Alternatively, the pathfinding process could automatically choose a category to avoid. For example, the pathfinding system may be sold as a system that always attempts to avoid using toll roads. Alternatively, the map database can be created to include different levels of costs, thus, preselecting which types of elements are to be avoided. Step 150 can include distinguishing one category of elements or many categories of elements.

Another alternative embodiment includes singling out a category of links to be favored. That is, the analysis could be reversed. A cost with a second level of representation could be considered less than one with a first level of representation. Alternatively, all the costs not favored would have a second level of representation and the costs favored would only include a first level of representation.

In step 152, the system creates new levels of costs. A cost structure may need to be set up if it has not already been done. For each category that was distinguished in step 150, data is inserted in the array such that the cost information includes a non-zero magnitude in a level of representation higher than the first level. For example, in Step 150, if the user distinguished toll roads as the only category for avoidance, then in step 152 costs for toll roads would be set up with non-zero magnitudes in the second levels of representation. If at step 150, the user distinguished toll roads and ferries as elements for different levels, with ferries to be avoided more than toll roads, then at step 152, toll roads would be set up with non-zero magnitudes in the second level of representation and ferries would be set up with non-zero magnitudes in the third level of representation. Step 152 includes creating or filling the arrays discussed above. If the system is working with a preexisting map database that already includes costs having only one level of representations, than some of these costs will be replaced with the new costs having a non-zero magnitude at a second level of representation. In one alternative, a new map database can be created which includes the new costs. This new map database is stored in a processor readable storage medium. In a second alternative, the original map database will remain unedited and the new costs will be stored in an additional data structure. After step 152, the system performs a pathfinding exploration in step 154.

Figure 5:
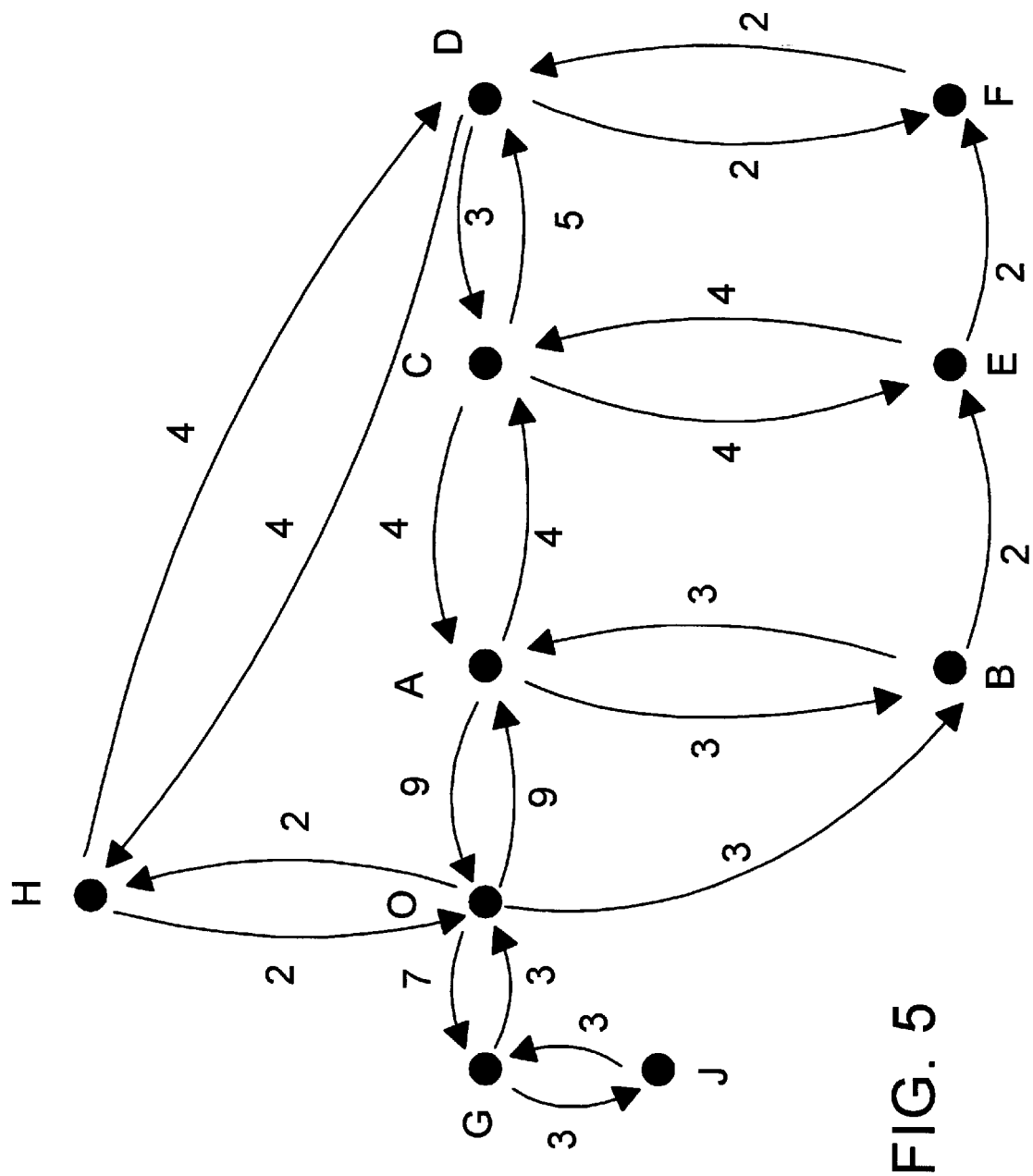
FIG. 5 is a fourth example of directed graph representing a part of a network.

FIG. 5 represents the directed graph for a portion of an electronic map. The directed graph depicted includes ten nodes (A, B, C, D, E, F, G, H, J, and O) and various links between the nodes. Each of the links include a number adjacent to the link. This number represents the cost of traveling along that link.

Figure 6:
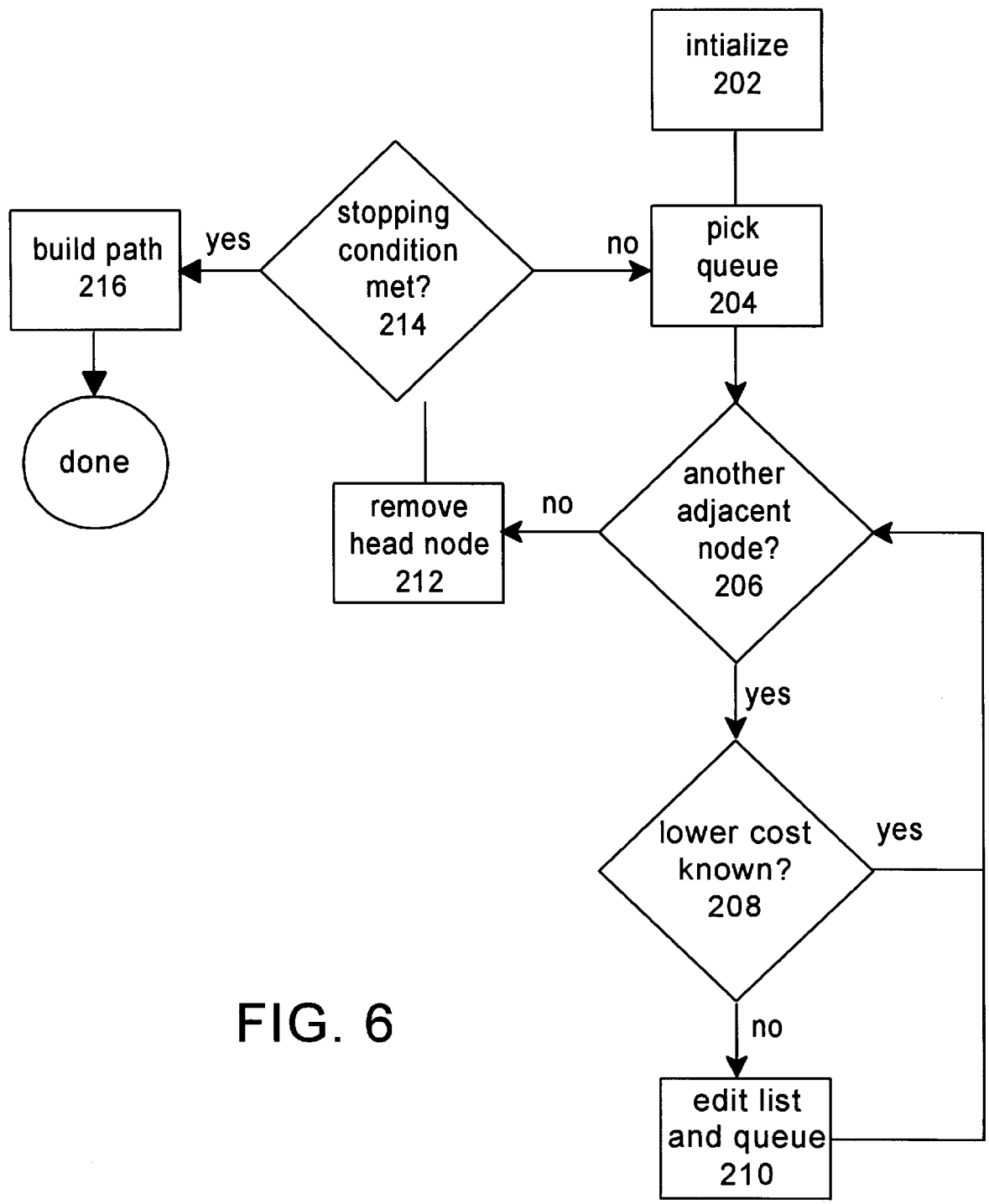
FIG. 6 is a flow chart describing the pathfinding step of FIG. 4.

FIG. 5 will be used along with FIG. 6 to further explain the details of step 154 in FIG. 4. For example purposes, assume that in step 150 of FIG. 4, a user distinguished toll roads as the only category of links to be avoided. Assume for purposes of this example that the links connecting node H to node D (two links in opposition directions), are part of a toll road and the remainder of the links are not toll roads. The original map data base included the costs as shown in FIG. 5. In step 152, the cost structure for toll roads is changed to include two levels of representation. The cost of the link for traveling from node H to node D is represented as 4ω+0 or [4,0].

FIG. 6 is a flow chart which explains the pathfinding computation (also called a pathfinding exploration). The pathfinding computation of FIG. 6, which is based at least in part on the work of Edsger W. Dijkstra, is only one of many pathfinding methods that can be used with the present invention. One reference that discusses Dijkstra's method is M. N. S. Swamy and K. Thulasiraman, *Graphs, Networks, and Algorithms*, John Wiley & Sons (1981). In step 202 the system initializes the pathfinding computation. That is, the system stores the origin and destination of the path and sets up two queues: an origin priority queue and a destination priority queue. The origin priority queue consists of an ordered list of nodes, to each of which a path from the origin is known, and a key for each node. The queue is sorted according to the key. There are various alternatives for determining the key. In one alternative, the key is the lowest known cost of traveling from the origin to the node. An alternative key includes the sum of the shortest known distance from the origin to the node plus an estimated cost of traveling from the node to the destination. There are various alternatives for estimating the cost for traveling from the node to the destination which is suitable for this method. One example includes multiplying the direct "as-the-crow-flies" distance by the estimated cost per unit distance. That is, disregarding the nodes and links, determining the physical distance between the node and the destination and multiplying that distance by an estimated cost per unit distance.

The destination priority queue consists of an ordered list of nodes, from each of which a path to the destination is known, and a key for each node. The queue is sorted according to the key. There are many alternatives for determining a destination key. One alternative includes using the lowest known cost path from the node to the destination. An alternative key includes using the sum of the lowest known cost from the node to the destination plus an estimated cost from the origin to the node. Other methods of computing a key are suitable within the scope of the present invention.

Additionally, the system sets up an origin visited list and a destination visited list. The origin visited list maintains a list of all nodes to which paths from the origin are known, the lowest cost for traveling from the origin to the node, and the previous node along the path with that lowest cost. The destination visited list stores the name of each node for which paths to the destination are known, the lowest known cost for traveling from the node to the destination, and the identity of the next node along the path to the destination with that lowest cost. After the initialize step 202 is completed, the origin priority queue and the origin visited list include the origin, and the destination priority queue and the destination visited list include the destination.

Once the system is initialized, the system chooses a queue according to a rule in step 204. There are many rules of picking a queue which are suitable for the present invention. In one system, the queue containing the element with the smallest key is chosen, with ties broken arbitrarily. In another system, the queue containing the fewest elements is chosen. Other examples of rules for choosing a queue include alternating between queues, choosing the origin queue for a time period, switching to the destination queue for a time period, switching back to the origin queue for a time period, etc. Since the queues are sorted by keys, the node with the smallest key will be at the head of the queue (also called the front or the top of the queue). This node is called the "head node." In the example discussed below, the method for picking a queue will be to alternate starting with the origin priority queue.

In step 206 the system looks for all nodes which are adjacent nodes to the head node of the chosen queue. Since the system just started, the only node in the origin priority queue is the origin. The adjacent nodes are those nodes which can be traveled to from the origin without going through any other nodes. The adjacent nodes for the origin O are nodes A, B, G and H. Since there are four adjacent nodes, the system arbitrarily picks one adjacent node. In step 208 the system determines whether there is a lower cost known on the visited list or the priority queue for the adjacent node picked. That is, the system determines the cost of traveling between the adjacent node and the head node. In this case, the adjacent node picked is node A, the cost of traveling from the origin to node A is 9. Since the pathfinding computation has just started, node A is not on the visited list or the origin priority queue so there is no other cost known for node A. If there is a lower cost known (in step 208), the system loops back to step 206 Since there is no known cost, in step 210 the system edits the visited list and the priority queue to add node A and its cost. The method loops back to step 206 to determine whether any additional adjacent nodes have not been considered. In this case there are three adjacent nodes that have not been considered: B, G and H.

In step 208 the system determines whether there is a lower cost known for node B. The cost for traveling from origin to B is 3 and B does not appear on the priority queue or the visited list. In step 210 node B is added to the priority queue and the visited list. The system loops back to step 206 and considers node G, and since there is no cost known lower than the cost of going directly from the origin O to G, which is 7, G is added to the priority queue and the visited list. The system then loops back to step 206 and considers node H. Since there is no known cost lower than the cost of going directly from origin O to node H, which is 2, H is added to priority queue in the visitor list. The system loops back to step 206 and determines that there are no additional adjacent nodes; therefore, in step 212 the head node, which is currently the origin O, is removed from the priority queue. Table 2 reflects the contents of the origin priority queue and the visited list at this point in the pathfinding computation. There are four nodes on the origin priority queue: B, G, A and H. Their keys represent the cost of traveling from the origin to that node. The visited list has three columns: Node, Cost and Prev. The node column lists the node identification, the cost column lists the lowest known cost of traveling from the origin to that node and the Prev column lists the previous node along the path from the origin to the listed node when traveling along the path utilizing the lowest known cost. The order that the nodes are listed in the visited list can be any order that makes it easy to search the list. For example, the nodes can be listed in alphabetical order. In one implementation, the nodes are named by numerical codes and the visited list is a hash table.

TABLE 2

| Origin Priority Queue | | Origin Visited List | | |
|---|---|---|---|---|
| Node | Key | Node | Cost | Prev |
| H | [0,2] | A | [0,9] | O |
| B | [0,3] | B | [0,3] | O |
| G | [0,7] | G | [0,7] | O |
| A | [0,9] | H | [0,2] | O |
|  |  | O | [0,0] | O |

In step 214 the system determines whether a stopping condition has been met. There are many stopping conditions which are suitable for the present invention, for example, stopping when a node has been the head node on both the origin priority queue and the destination priority queue. Another stopping condition, which is the stopping condition used in this example, is stopping when the cost of traveling from the origin to the head node in the origin priority queue plus the cost of traveling from the head node of the destination priority queue to the destination is greater than or equal to the total cost of the best connection node. A connection node is a node that appears on the destination visited list and the origin visited list. The total cost of a connection node is the cost from the origin to the connection node plus the cost from the connection node to the destination. The best connection node is the connection node with the lowest total cost. In the present case there is no connection node so the stopping condition fails and, in step 204, the system picks a queue.

As discussed above, the method for picking a priority queue in the present example is simply alternating; therefore, the system picks the destination queue. In step 206 the system determines whether there are any nodes adjacent to the destination D. In the present example, there are three adjacent nodes C, F and H. In step 208 the system looks at node C and determines whether there is a lower known cost. Since there is not, in step 210 the destination priority queue and visited list are edited to add node C and its cost. The method loops back to step 206 which determines that there is another adjacent node, node F. In step 208 the system determines that there is not a lower cost known for F. The priority queue and visited list are edited in step 210 to add node F. The method then loops back to step 206 which determines that there is another adjacent node, node H. In step 208, the system determines that there is not a lower cost known for traveling from H to D. In step 210, the destination priority queue and the visited list are edited to add node H and its cost to traveling to D, which is 4ω or [4,0]. In step 206 the system determines there are no more adjacent nodes to node D and node D is removed from the destination priority queue in step 212. Table 3 reflects the state of the destination priority queue and visited list at this point in the method.

TABLE 3

| Dest. Priority Queue | | Dest. Visited List | | |
|---|---|---|---|---|
| Node | Key | Node | Cost | Next |
| F | [0,2] | C | [0,5] | D |
| C | [0,5] | D | [0,0] | D |
| H | [4,0] | F | [0,2] | D |
|  |  | H | [4,0] | D |

In step 214, the system determines whether the stopping condition has been met. At this point there is a connection node. Node H is on both visited lists. The total cost for node H is [4,2] or 4ω+2. That is, the cost of traveling from the origin to node H is [0,2] and from node H to the destination is [4,0]. The stopping condition is not met because the cost of traveling from the origin to the head node in the origin priority queue (H) is [0,2] and the cost of traveling from the head node of the destination queue (F) to the destination is [0,2]. The sum of the two costs is [0,4] which is lower than the total cost of the connection node H; therefore, the stopping condition fails and the system picks the origin priority queue in step 204.

The head node on the origin priority queue is node H. The only adjacent node to node H is node D. In step 208, there is not a lower cost known for node D. Therefore, in step 210 the visited list and priority queue are edited to include the cost of traveling to node D from node H, which is [4,0]. Table 4 reflects the current state of the origin priority queue and the visited list after node 4 was removed from the priority queue (step 212).

TABLE 4

| Origin Priority Queue | | Origin Visited List | | |
|---|---|---|---|---|
| Node | Key | Node | Cost | Prev |
| B | [0,3] | A | [0,9] | O |
| G | [0,7] | B | [0,3] | O |
| A | [0,9] | D | [4,2] | H |
| D | [4,2] | G | [0,7] | O |
|  |  | H | [0,2] | O |
|  |  | O | [0,0] | O |

In step 214, the system determines whether the stopping condition has been met. At this point, there are two connection nodes: node H and node D. The total cost of node H is [4,2]. The total cost for node D is also [4,2]. The cost of traveling from the origin to the head node of the origin priority queue and from the head node of the destination queue to the destination is equal to [0,7] which is less than the total cost for nodes H and D; therefore, the stopping condition fails.

In step 206 the system looks for adjacent nodes to the head node on the destination queue. Since the head node is node F, the only adjacent node is node E. Note that node D is not processed as an adjacent node because it is the node used to get to F. The cost of traveling from E to F is [0,2], thus, the cost traveling from E to F to D is [0,4]. In step 208 the system determines that there is not a lower cost known for traveling from E to D so the visited list and priority queue are updated accordingly. In step 206 the system determines that there is not another adjacent node and F is removed from the priority queue in step 212. Table 5 reflects the state of the destination priority queue and visited list at this point in the method.

TABLE 5

| Dest. Priority Queue | | Dest. Visited List | | |
|---|---|---|---|---|
| Node | Key | Node | Cost | Next |
| E | [0,4] | C | [0,5] | D |
| C | [0,5] | D | [0,0] | D |
| H | [4,0] | E | [0,4] | F |
| | | F | [0,2] | D |
| | | H | [4,0] | D |

In step 214, the system determines whether the stopping condition has been met. At this point there are still two connection nodes: H and D. The stopping condition is not met because the cost of traveling from the origin to the head node (B) in the origin priority queue is [0,3] and the cost of traveling from the head node (C) from the destination priority queue to the destination is [0,5]. The sum of the two costs is [0,8] which is lower than the total cost for connection nodes H or D.

From Table 4, it can be seen that the head node on the origin priority queue is node B. The adjacent nodes to node B are nodes A and E. In step 208, the system looks at node A and determines that there is not a lower cost known for node A. Although A does appear in the visited list with a cost of [0,9], the cost of traveling from the origin to node A via node B is [0,6]. That is, the cost of traveling from 0 to B is [0,3] and the cost of traveling from B to A is [0,3]. Thus, the cost of traveling from O to B to A is [6,0] which is lower than the cost of traveling from 0 directly to A. Therefore, in step 210, the visited list and the priority queue are edited to include the cost of traveling to node A from the origin, which is now [0,6] and the previous node in the visited list for node A becomes B. That is, to get from A to O at a cost of [0,6], one must travel through node B. In step 206, the system determines that there is another adjacent node, E. In step 208 the system determines that there is not a lower cost known for E and the priority queue and visitor list are edited to include E. Table 6 reflects the current state of the origin priority queue and the visitor list after node B was removed from the priority queue (step 212).

TABLE 6

| Origin Priority Queue | | Origin Visited List | | |
|---|---|---|---|---|
| Node | Key | Node | Cost | Prev |
| E | [0,5] | A | [0,6] | B |
| A | [0,6] | B | [0,3] | O |

TABLE 6-continued

| Origin Priority Queue | | Origin Visited List | | |
|---|---|---|---|---|
| Node | Key | Node | Cost | Prev |
| G | [0,7] | D | [4,2] | H |
| D | [4,2] | E | [0,5] | B |
| | | G | [0,7] | O |
| | | H | [0,2] | O |
| | | O | [0,0] | O |

In Step 214 the system determines that the stopping condition has been met. At this point there are three connection nodes: E, H, D. The total cost of connection node E is [0,9], the total cost of connection node H is [4,2] and the total cost of connection node D is [4,2]. Since node E has the lowest total costs of all the connection nodes, node E is considered the best connection node. The cost of traveling from the origin to the head node on the origin priority queue is [0,6]. The cost of traveling from the head node of the destination priority queue to the destination is [0,5]. Therefore, the cost of traveling to and from the head nodes is [0,11], which is greater than the total cost of the best cost connection node, which is [0,9]. Thus, the stopping condition is met and the system builds the path in step 216.

The step of building the path is as follows. A rule selects some connection node. One such rule is to choose the best connection node. The selected connection node K is looked up in the origin visited list and the previous node $P_1$ on the path from the origin is found. If $P_1$ is not the origin, then $P_1$ is looked up in the visited list and the previous node $P_2$ on the path in the origin is found. This continues until the origin is reached. Suppose the origin is reached as node $P_L$. Similarly, K is looked up in the destination visited list and the next node $N_1$ on the path to the destination is found. If $N_1$ is not the destination, then $N_1$ is looked up in the visited list This continues until the destination is reached. Suppose the destination is reached as node $N_M$. At this point the path from the origin to the destination is known: it is the path from $P_L$ (the origin) to $P_{L-1}$, to $P_{L-2}$, . . . to $P_2$, to $P_1$, to K, to $N_1$, . . . , to $N_{M-1}$, to $N_M$ (the destination).

In the present example, node E was the best connection node. Looking at the visited list in Table 6, the best known cost of traveling from the origin to node E involves traveling from node B to node E. Thus, the path being built will travel from B to E. The system then finds node B in the visited list and determines that the best path to node B is directly from the origin O. At this point the path built includes traveling from O to B to E. After the system reaches the origin, the system builds a path from the connection node to the destination. Looking at the visited list in Table 5, the best path from E to the destination involves traveling from E to F. Thus, P is added to the path. The visited list also indicates that the best path from P to D is directly from F to D. Thus, the path built is OBEFD. As can be seen, the pathfinding computation avoids the use of the toll road represented by the link from H to D.

In some systems, the pathfinding computation is speeded up by not considering all nodes to which a head node is connected to. Rather, the exploration is limited to certain neighboring nodes. One such method classifies nodes according to the importance of the roads on which they occur, and progressively restricts the use of neighboring nodes as a distance from the origin (or to the destination) increases. For example, if the cost measure being used is an estimate of driving time, the exploration might not use residential-level roads more than two minutes' driving time from the origin or destination, nor use arterial-level roads more than ten minutes' driving time from the origin or destination, and so on.

In one implementation of the current invention, an electronic map will be stored as a separate database and the pathfinding apparatus will include software with two main modules. A first module performs steps 150 and 152 of FIG. 4. The second module performs the pathfinding function. The first module will set up a cost model which indicates how many levels of representation to use for storing the costs and an index (or definition) for determining costs. The index would include such information as for every arterial the cost will be equal to X multiplied by each unit of distance of the link, for each residential the cost will be equal to Y multiplied by each unit of distance for the link, and so on. The cost model is passed to the pathfinding function.

In one alternative, the present invention can be used as part of a dynamic traffic avoidance system using an electronic map. A driver may learn that a particular road or set of roads are experiencing traffic problems. Looking at FIG. 4, the driver will use the system to identify the roads experiencing traffic problems in step 150. The costs for the roads experiencing traffic problems will have a non-zero magnitude for the second level of representation (e.g. $a_1\omega + a_0$, where $a_1 \neq 0$). In step 154, a path will be computed which directs the driver to the destination while avoiding the roads experiencing traffic problems.

Although the examples used above to describe the present invention were directed to an electronic map of roads, the present invention also applies to any suitable processor readable representation of a network. Suitable networks include a graph of a manufacturing process, intermodal travel plan (e.g., a graph representing travel between points via airplanes, trains, automobiles, buses, etc.), a system for providing medical treatment, etc. For example, if the network represents a manufacturing process, the nodes may represent decision points in the process (e.g. which station to transport the article of manufacture or which semiconductor process to use), and the links can represent process time or manufacturing costs.

The foregoing detailed description of the invention has been presented for purposes of illustration and description. It is not intended to be exhaustive or to limit the invention to the precise form disclosed, and obviously many modifications and variations are possible in light of the above teaching. The described embodiment was chosen in order to best explain the principles of the invention and its practical application to thereby enable others skilled in the art to best utilize the invention in various embodiments and with various modifications as suited to the particular use contemplated. It is intended that the scope of the invention be defined by the claims appended hereto.

I claim:

1. A computer implemented method for finding a path between an origin and a destination using a processor readable representation of a network, comprising the steps of:
   distinguishing a first set of one or more elements in said processor readable representation of said network, each of said first set of elements being associated with one or more original costs;
   creating a first set of one or more new costs associated with said first set of elements, said one or more new costs including at least two levels of representation; and
   determining a path in said processor readable representation of said network from said origin to said destination, using a processor, said step of determining uses at least one of said new costs.

2. A method according to claim 1, wherein:
said first set of elements is a set of links.

3. A method according to claim 1, wherein:
said processor readable representation of a network is an electronic map; and
said first set of elements is a set of links representing toll roads.

4. A method according to claim 1, wherein:
said processor readable representation of a network is an electronic map; and
said first set of elements is a link representing a toll road.

5. A method according to claim 1, wherein:
said step of distinguishing includes receiving an input from a user and identifying elements of said first set based on said input.

6. A method according to claim 1, wherein:
said step of distinguishing includes automatically, without user input, identifying elements of said first set.

7. A method according to claim 1, wherein:
said step of creating includes replacing a preexisting cost with said first cost, said preexisting cost only containing a non-zero magnitude for one level of representation.

8. A method according to claim 1, wherein:
said two levels of representation include a first level and a second level, said second level being superior to said first level.

9. A method according to claim 1, wherein:
said first cost is a non-standard number.

10. A method according to claim 1, wherein:
said first cost can be represented with a non-zero multiple of an infinite integer.

11. A method according to claim 1, wherein:
said first cost is stored in a multi-element data structure.

12. A method according to claim 1, wherein:
said first cost is stored in an array.

13. A method according to claim 1, further including the step of:
creating a cost model that includes at least two levels of representation.

14. A method according to claim 1, wherein:
said first set of elements includes a first element having a first cost, said first cost having two levels of representation, said first element represents an aggregate of links;
said two levels of representation of said first cost include a first level and a second level, said first level representing a count of said links in said aggregate.

15. A method according to claim 1, wherein:
said two levels of representation include a first level and a second level, a sum of a magnitude of said first level and a magnitude of said second level being an estimate of a quantity to be minimized.

16. A method according to claim 1, further including the step of:
reporting said path.

17. A method according to claim 1, further including the step of:
receiving an indication of said origin.

18. A method according to claim 1, further including the step of:
receiving an indication of said destination.

19. A method according to claim 1, further including the steps of:
- storing an indication of said origin; and
- storing an indication of said destination.

20. A method according to claim 1, further including the steps of:
- distinguishing a second set of one or more elements in said electronic map to avoid; and
- creating a second cost associated with a first element of said second set of elements, said second cost including non-zero magnitudes for at least three levels of representation, said step of performing uses said second cost.

21. A method according to claim 20, wherein:
said second cost being greater than said first cost, regardless of said first cost's magnitudes and said second cost's magnitudes.

22. A method according to claim 1, wherein:
said processor readable representation of a network is an electronic map.

23. A method according to claim 22, wherein:
said step of performing attempts to minimize costs.

24. A method according to claim 22, wherein:
said step of determining a path includes the steps of:
- setting up a priority queue and a visited list, said priority queue stores node identifications and keys, said visited list stores node identifications and costs of traveling from an origin,
- initializing said priority queue,
- finding a set of nodes adjacent to said origin,
- determining a cost of traveling to each of said adjacent nodes from said origin,
- inserting said adjacent nodes into said priority queue, sorted by key,
- inserting said adjacent nodes into said visited list,
- removing said origin from said priority queue,
- finding a set of nodes adjacent to a node at said queue's head,
- determining a cost of traveling to each of said nodes adjacent to said node at said queue's head,
- inserting into said priority queue at least a subset of said nodes adjacent to said node at said queue's head,
- inserting into said visited list, if not already in said visited list with a lower costs, said nodes adjacent to said node at said queue's head, and
- removing from said priority queue said node at said queue's head.

25. A method according to claim 22, wherein:
said electronic map includes links and nodes and said first set of elements is a set of links; and
said two levels of representation include a first level and a second level, said second level being superior to said first level, said second level being a multiple of a non-zero power of an infinite integer.

26. A method for creating an electronic map, comprising the steps of:
- identifying nodes,
- identifying a set of links between nodes;
- identifying a first subset of links to attempt to avoid;
- assigning costs for traversing said set of links, at least a first subset of one or more costs including a first level of representation and a second level of representation, said second level of representation being superior to said first level of representation, said first subset of one or more costs being associated with said first subset of links; and
- storing data representing said nodes, said links and said costs in a map database, said map database residing in a processor readable storage medium.

27. A method according to claim 26, wherein:
the step of storing includes storing data representing said costs in an array.

28. A method according to claim 26, wherein:
said second level of representation including a multiple of a non-zero power of an infinite number.

29. A machine including one or more processor readable storage elements, said one or more processor readable storage elements storing an electronic map generated by the method of claim 26, said one or more processor readable storage elements further include processor readable code for using said electronic map to determine a path from an origin to a destination.

30. A method of enhancing an electronic map database, said map database including nodes, links between nodes and costs of links, the method comprising the steps of:
- receiving an input identifying a set of links to attempt to avoid;
- creating an indication of a second level of costs for said set of links; and
- storing said indication of second level of costs in a processor readable storage medium, said stored second level of costs being associated with said electronic map database such that said electronic map database and said second level of costs can be used to determine a path in said electronic map database from an origin to a destination that attempts to avoid said set of links.

31. A method according to claim 30, wherein:
the step of storing includes storing data representing said second level of costs in an array.

32. A method according to claim 30, wherein:
said step of creating includes replacing a preexisting cost with a new cost, said new cost being a product of said preexisting cost and an infinite number.

33. A processor readable storage medium having processor readable program code embodied on said processor readable storage medium, said processor readable code for programming a processor to perform a method of finding a path using a processor readable representation of a network, said processor readable code comprising:
- first program code, said first program code finds a first path from a first node to a second node, said first path including a first set of one or more links and a first set of one or more costs;
- second program code, said second program code finds a second path from said first node to said second node, said second path including a second set of one or more links and a second set of one or more costs, at least one of said second set of costs having at least two levels of representation, and
- third program code, said third program code chooses said first path because said first set of one or more costs is more efficient than said second set of one or more costs.

34. A processor readable storage medium according to claim 33, wherein:
said two levels of representation include a first level and a second level, said second level being superior to said first level.

35. A processor readable storage medium according to claim 34, further including:
fourth program code, said fourth program code creates a cost model for said network.

36. A processor readable storage medium according to claim 34, wherein said third program code chooses said first path at least partially based on dynamic traffic conditions.

37. A processor readable storage medium according to claim 34, wherein:

said processor readable representation of a network is an electronic map.

38. A processor readable storage medium according to claim 37, wherein:

said third program code determines a first sum of said first set of costs and a second sum of said second set of costs; and said third program code determines that said first sum is less than said second sum.

39. A processor readable storage medium according to claim 38, wherein:

said first sum and said second sum are stored in a computer memory.

40. An apparatus for finding a path from an origin to a destination using a processor readable representation of a network, comprising:

an input device;

a processor readable storage device capable of storing at least a portion of said processor readable representation of said network;

a display; and a processor in communication with said input device, said storage device and said display, said processor being programmed to:

distinguish a first set of one or more elements in said network;

create a first cost associated with a first element of said first set of elements, said first cost including at least two levels of representation; and determine a path from said origin to said destination using said first cost.

41. An apparatus according to claim 40, wherein:

said two levels of representation include a first level and a second level, said second level being superior to said first level.

42. A apparatus according to claim 40, wherein:

said processor readable representation of a network is an electronic map.

43. A processor readable storage medium having processor readable code embodied on said processor readable storage medium, said processor readable code for programming a processor to perform a method of finding a path from an origin to a destination using a processor readable representation of a network, said method comprising the steps of:

distinguishing a first set of one or more elements in said network, each of said first set of elements being associated with one or more original costs;

creating a first set of one or more new costs associated with said first set of elements, said new costs including at least two levels of representation; and determining a path in said processor readable representation of said network from said origin to said destination using at least one of said new costs.

44. A processor readable storage medium according to claim 43, wherein said method further includes the step of:

reporting said path.

45. A processor readable storage medium according to claim 43, wherein:

said two levels of representation include a first level and a second level, said second level being superior to said first level.

46. A processor readable storage medium according to claim 45, wherein:

said processor readable representation of a network is an electronic map.

47. A processor readable storage medium according to claim 45, wherein:

said step of distinguishing can be used to identify a traffic problem; and said step of determining finds a path that avoids said traffic problem.

48. A processor readable storage medium having processor readable code embodied on said processor readable storage medium, said processor readable code for programming a processor to perform a method of finding a path from an origin to a destination using a processor readable representation of a network, said method comprising the steps of:

creating an indication of a second level of costs for a set of one or more elements in said processor readable representation of a network; and determining a path in said processor readable representation of said network from said origin to said destination using said second level of costs.

49. A processor readable storage medium according to claim 48, wherein said method further includes the step of:

storing said indication of said second level of costs.

50. A processor readable storage medium according to claim 48, wherein said method further includes the step of:

reporting said path.

* * * * *